US010553115B1

(12) United States Patent
Ismaili et al.

(10) Patent No.: US 10,553,115 B1
(45) Date of Patent: Feb. 4, 2020

(54) SYSTEM AND METHOD OF VEHICULAR COLLISION AVOIDANCE

(71) Applicant: Allstate Insurance Company, Northbrook, IL (US)

(72) Inventors: Alinawaz Ismaili, Skokie, IL (US); Brennan Gee, Roanoke, VA (US); Francis Lowry, Clogher (GB); Theresa A. Owens, Chicago, IL (US)

(73) Assignee: Allstate Insurance Company, Northbrook, IL (US)

(*) Notice: Subject to any disclaimer, the term of this patent is extended or adjusted under 35 U.S.C. 154(b) by 0 days.

(21) Appl. No.: 14/601,881

(22) Filed: Jan. 21, 2015

(51) Int. Cl.
*G06G 1/16* (2006.01)
*G08G 1/0967* (2006.01)
*G08G 1/16* (2006.01)

(52) U.S. Cl.
CPC ........... *G08G 1/166* (2013.01); *G08G 1/0967* (2013.01)

(58) Field of Classification Search
CPC .. G08G 1/096791; G08G 1/166; G08G 1/167; G08G 1/163; G08G 1/161; G08G 1/096716; G08G 1/096775; G08G 1/0965; G08G 1/16; G08G 1/165; G08G 1/00; G08G 1/09; G08G 1/096758; G08G 1/005; G08G 1/096725; G08G 1/09675; G08G 1/0969; G08G 1/142; G08G 1/164; G08G 1/20; G08G 9/02; G08G 1/0962; G08G 1/096741; G08G 1/0104; G08G 1/168; G08G 1/0112; G08G 1/017; G08G 1/04;

(Continued)

(56) References Cited

U.S. PATENT DOCUMENTS 5,433,296 A 7/1995 Webberley
5,835,008 A 11/1998 Colemere, Jr.
(Continued)

FOREIGN PATENT DOCUMENTS

WO 1997027079 A1 7/1997
WO 2013074983 A1 5/2013

OTHER PUBLICATIONS

"A smart approach to safety", Traffic Technology Today.com, http://www.traffictechnologytoday.com/features.php?BlogID=412, retrieved May 12, 2014.

(Continued)

*Primary Examiner* — Emily C Terrell
(74) *Attorney, Agent, or Firm* — Banner & Witcoff, Ltd.

(57) ABSTRACT

Systems and methods are provided for acquiring and analyzing vehicle operation data in conjunction with traffic light information to manage traffic and avoid collisions. A traffic management system determines whether a vehicle is likely to be involved in a collision, based on at least vehicle operation data and the status of traffic lights. If it is determined that a vehicle is likely to be involved in a collision, the traffic management system may issue a notification or warning to the vehicle, e.g., instructing the vehicle to increase or decrease its rate of acceleration, and/or apply its brakes. Where the vehicle does not respond to the notification or warning, the traffic management system may take control of the vehicle, and notify and warn other vehicles and/or systems of its actions. Where the vehicle responds to the notification or warning, the traffic management system may calculate and recommend an insurance benefit.

18 Claims, 5 Drawing Sheets

(58) Field of Classification Search
CPC ........ G08G 1/048; G08G 1/075; G08G 1/087;
G08G 1/094; G08G 1/09626; G08G
1/143; G08G 1/162; G08G 1/205; B60W
2550/402; B60W 50/14; B60W
2050/0078; B60W 30/18154; B60W
2050/046; B60W 2550/20; B60W 30/095;
B60W 2550/22; G01S 17/936; G01S
2205/002; G01S 5/0072; G01S 15/42;
G01C 21/26; H04W 74/0816; H04W
76/002; B60R 21/013; B60R 21/0134;
B60R 21/0136; B60R 21/01532; B60R
21/01534; G05D 1/0278; G06Q 40/08;
G06F 17/30241; G06F 11/3065
USPC .................. 340/905, 901, 907, 929
See application file for complete search history.

(56) References Cited

U.S. PATENT DOCUMENTS

| | | | |
|---|---|---|---|
| 6,067,031 A | 5/2000 | Janky et al. | |
| 6,223,125 B1 | 4/2001 | Hall | |
| 6,487,500 B2* | 11/2002 | Lemelson | G01S 19/11 |
| | | | 340/436 |
| 6,985,073 B1 | 1/2006 | Doan | |
| 7,190,260 B2 | 3/2007 | Rast | |
| 7,466,227 B2 | 12/2008 | Chen et al. | |
| 7,796,081 B2 | 9/2010 | Breed | |
| 7,821,421 B2 | 10/2010 | Tamir et al. | |
| 8,078,379 B2* | 12/2011 | Lu | B60T 7/18 |
| | | | 340/917 |
| 8,410,957 B2 | 4/2013 | Mizuno | |
| 9,262,918 B2* | 2/2016 | Otake | G08G 1/095 |
| 2002/0036584 A1* | 3/2002 | Jocoy | G01S 13/931 |
| | | | 342/70 |
| 2002/0070880 A1* | 6/2002 | Dotson | G08G 1/087 |
| | | | 340/901 |
| 2002/0082806 A1* | 6/2002 | Kaub | G08G 1/0104 |
| | | | 702/182 |
| 2003/0125846 A1* | 7/2003 | Yu | G08G 1/20 |
| | | | 701/1 |
| 2003/0149530 A1* | 8/2003 | Stopczynski | B60R 21/013 |
| | | | 701/301 |
| 2004/0102889 A1* | 5/2004 | Ibrahim | B60K 31/0008 |
| | | | 701/96 |
| 2005/0134478 A1* | 6/2005 | Mese | G08G 1/096716 |
| | | | 340/901 |
| 2007/0222638 A1* | 9/2007 | Chen | G08G 1/096 |
| | | | 340/901 |
| 2010/0214126 A1* | 8/2010 | Publicover | G08G 1/095 |
| | | | 340/907 |
| 2010/0225762 A1 | 9/2010 | Augst | |
| 2011/0298603 A1* | 12/2011 | King | G08G 1/042 |
| | | | 340/436 |
| 2011/0304465 A1 | 12/2011 | Boult et al. | |
| 2012/0303222 A1* | 11/2012 | Cooprider | B60W 10/06 |
| | | | 701/48 |
| 2013/0110315 A1* | 5/2013 | Ogawa | G08G 1/096716 |
| | | | 701/1 |
| 2013/0311641 A1 | 11/2013 | Chow et al. | |
| 2014/0009275 A1* | 1/2014 | Bowers | B60Q 1/00 |
| | | | 340/436 |
| 2014/0118168 A1 | 5/2014 | Lee et al. | |
| 2014/0172467 A1* | 6/2014 | He | B60K 28/066 |
| | | | 705/4 |

OTHER PUBLICATIONS

Barth, Alexander et al., "Fast and Precise Localization at Stop Intersections", 2013 IEEE Intelligent Vehicles Symposium Workshops (IV Workshops) Jun. 23-26, 2013, Gold Coast, Australia.
Webb, Mick, "Putting the brakes on running red lights—Mercedes Benz 'Smart Stop' technology", Oct. 16, 2009, http://www.gizmag.com/mercedes-benz-smart-stop-system/13122/.
Iiiaifar, Amir, "Watching out when you aren't: infiniti's and mercedes' car safety suites square off", Aug. 31, 2013, http://www.digitaltrends.com/cars/watching-out-for-you-when-you-arent-infinities-and-mercedes-car-safety-suites-square-off/#!MzNSB.
Mobileye—Our Vision. Your Safety, http://www.mobileye.com/ <retreived Jan. 20, 2015.

* cited by examiner

SYSTEM AND METHOD OF VEHICULAR COLLISION AVOIDANCE

BACKGROUND

Insurance companies value the safety of drivers and the general public. Accordingly, enforcing traffic signals and avoiding collisions between vehicles is a matter of good policy. For example, techniques exist for detecting impending collisions and notifying vehicles accordingly. Nevertheless, the prior art fails to provide for the combination of features disclosed herein.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A first aspect described herein provides an apparatus of a traffic management system. The apparatus may include at least one processor. The apparatus may be configured to, in operation, receive vehicle operation data corresponding to a first vehicle at a first time. Further, the apparatus may receive traffic light data originating from a traffic light database at a second time, wherein the traffic light database stored information describing one or more traffic lights. Based on the vehicle operation data and the traffic light operation data, the apparatus may determine a likelihood of collision associated with the first vehicle, and accordingly, determine a recommendation for the first vehicle based on the likelihood of collision. The recommendation may provide navigational guidance to avoid a collision. A notification, including the recommendation, may be outputted to the first vehicle. The apparatus may also calculate an insurance benefit for an individual associated with the first vehicle, in response to an appropriate reaction to the notification from the first vehicle. Otherwise, the apparatus may take inertial control of the first vehicle, in response to an inappropriate reaction to the notification from the first vehicle.

A second aspect described herein provides a computer-implemented method of managing traffic. A computing system may receive vehicle operation data origination from a first vehicle at a first time, and may also receive traffic light data origination from a traffic light database at a second time, wherein the traffic light database stores information describing one or more traffic lights. Based on the vehicle operation data and the traffic light operation data, the computing system may determine a likelihood of confusion associated with the first vehicle, and accordingly, determine a recommendation for the first vehicle based on the likelihood of collision. The recommendation may provide navigational guidance to avoid a collision. A notification, including the recommendation, may be outputted to the first vehicle. The computing system may also calculate an insurance benefit for an individual associated with the first vehicle, in response to an appropriate reaction to the notification from the first vehicle. Otherwise, the computing system may take inertial control of the first vehicle, in response to an inappropriate reaction to the notification from the first vehicle.

A third aspect described herein provides a vehicle, including a vehicular computer system. The vehicular computer system may be configured to, in operation, receive (e.g., generate, such as through one or more in-vehicle devices, e.g., OBDII, accelerometers, GPS, etc.) vehicle operation data of the vehicle at a first time. Further, the vehicular computer system may receive traffic light data originating from a remote service at a second time via an antenna configured to communicate via wireless communication. The remote service may provide access to information describing one or more traffic lights. Based on the vehicle operation data and the traffic light operation data, the vehicular computer system may determine a likelihood of collision associated with the vehicle, and accordingly, determine a recommendation for a driver of the vehicle based on the likelihood of collision. The recommendation may provide navigational guidance to the vehicle to avoid the collision. Further, the vehicular computer system may output a notification, including the recommendation, to the driver of the vehicle via a dashboard attached to the vehicle. The vehicular computer system may calculate an insurance benefit for the driver of the vehicle, in response to an appropriate reaction to the notification by the driver of the vehicle. Otherwise, the vehicular computer system may take inertial control of at least one pedal of the vehicle, in response to an appropriate reaction to the notification by the driver of the vehicle.

The details of these and other aspects of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

Aspects of the present disclosure are directed toward a traffic management system. The traffic management system may determine whether a vehicle is in danger of causing a collision with another vehicle, based on information about the vehicle and nearby traffic lights. Upon determining that a collision is likely, the traffic management system may notify or warn the vehicle or driver. If the driver responds to the notification of a likely collision, the traffic management system may determine whether the driver is eligible for an insurance benefit. Otherwise, the traffic management system may take control of the vehicle in order to prevent a collision, and notify or warn nearby vehicles accordingly.

As will be appreciated by one of skill in the art upon reading the follow disclosure, various aspects described herein may be embodied as a method, a computer system, or a computer program product. Accordingly, those aspects may take the form of an entirely hardware embodiment, an entirely software embodiment, or an embodiment combining software and hardware aspects. Furthermore, such aspects may take the form of a computer program stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in a form or electromagnetic waves traveling through signal-conducting media such as metal wires, optical fibers, and/or wireless transmission (e.g., air and/or space).

Moreover, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof, as well as additional items and equivalents thereof.

Figure 1A:
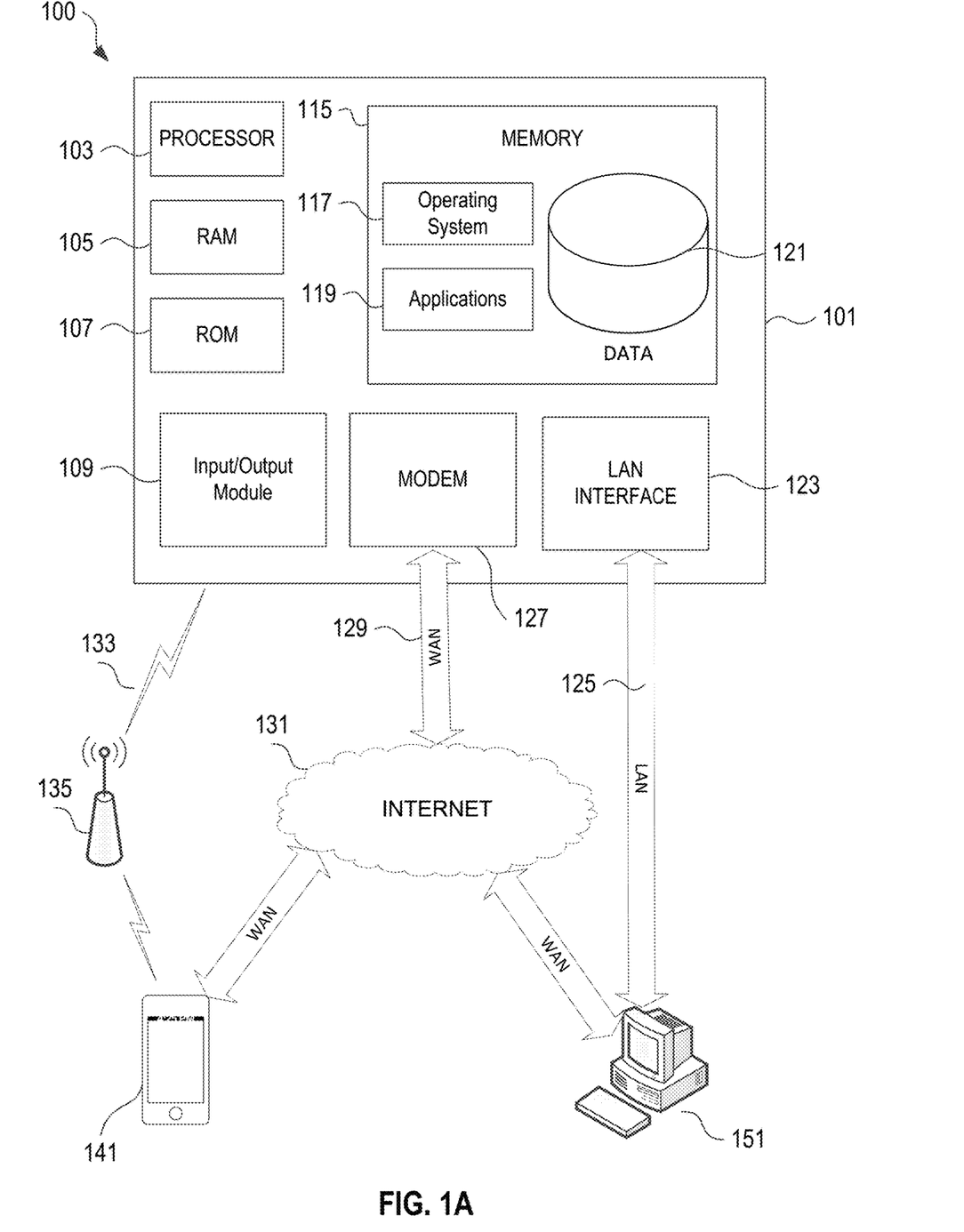
FIG. 1A illustrates a network environment and computing systems that may be used to implement aspects of the disclosure.

FIG. 1A illustrates a block diagram of a computing device 101 in a traffic management system 100 that may be used according to one or more illustrative embodiments of the disclosure. A traffic management device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a traffic management computing devices or systems, configured as described herein for transmitting and receiving vehicle operation data, transmitting and receiving traffic light data, analyzing vehicle driving data with relation to traffic light data, and notifying or controlling the vehicle accordingly.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the traffic management system 101 to execute a series of computer-readable instructions to transmit or receive vehicle operation data, transmit or receive traffic light data, analyze driving data with relation to traffic light data, and notify or control the vehicle accordingly.

The traffic management computing device 101 may operate in a networked environment 100 supporting connections to one or more remote computers, such as terminals/devices 141 and 151. Traffic management computing device 101, and related terminals/devices 141 and 151, may include devices installed in vehicles, mobile devices that may travel within vehicles, or devices outside of vehicles that are configured to receive and process vehicle and vehicle operation data. Thus, the traffic management computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the traffic management computing device 101. The network connections depicted in FIG. 1A include a local area network (LAN) 125 and a wide area network (WAN) 129, and a wireless telecommunications network 133, but may also include other networks. When used in a LAN networking environment, the traffic management computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, antennas, digital signal processors, and additional circuitry and software for communicating with wireless computing devices 141 (e.g., mobile phones, short-range vehicle communication systems, vehicle telematics devices) via one or more network devices 135 (e.g., base transceiver stations, antennas, etc.) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and traffic management system components described herein may be configured to communicate using any of these network protocols or technologies.

Additionally, one or more application programs 119 used by the traffic management computing device 101 may include computer executable instructions (e.g., vehicle operation analysis programs, traffic light analysis programs, and traffic control algorithms) for transmitting and receiving vehicle operation data, transmitting and receiving traffic light data, analyzing vehicle operation data with relation to traffic light, notifying or controlling the vehicle accordingly, and performing other related functions as described herein.

Figure 1B:
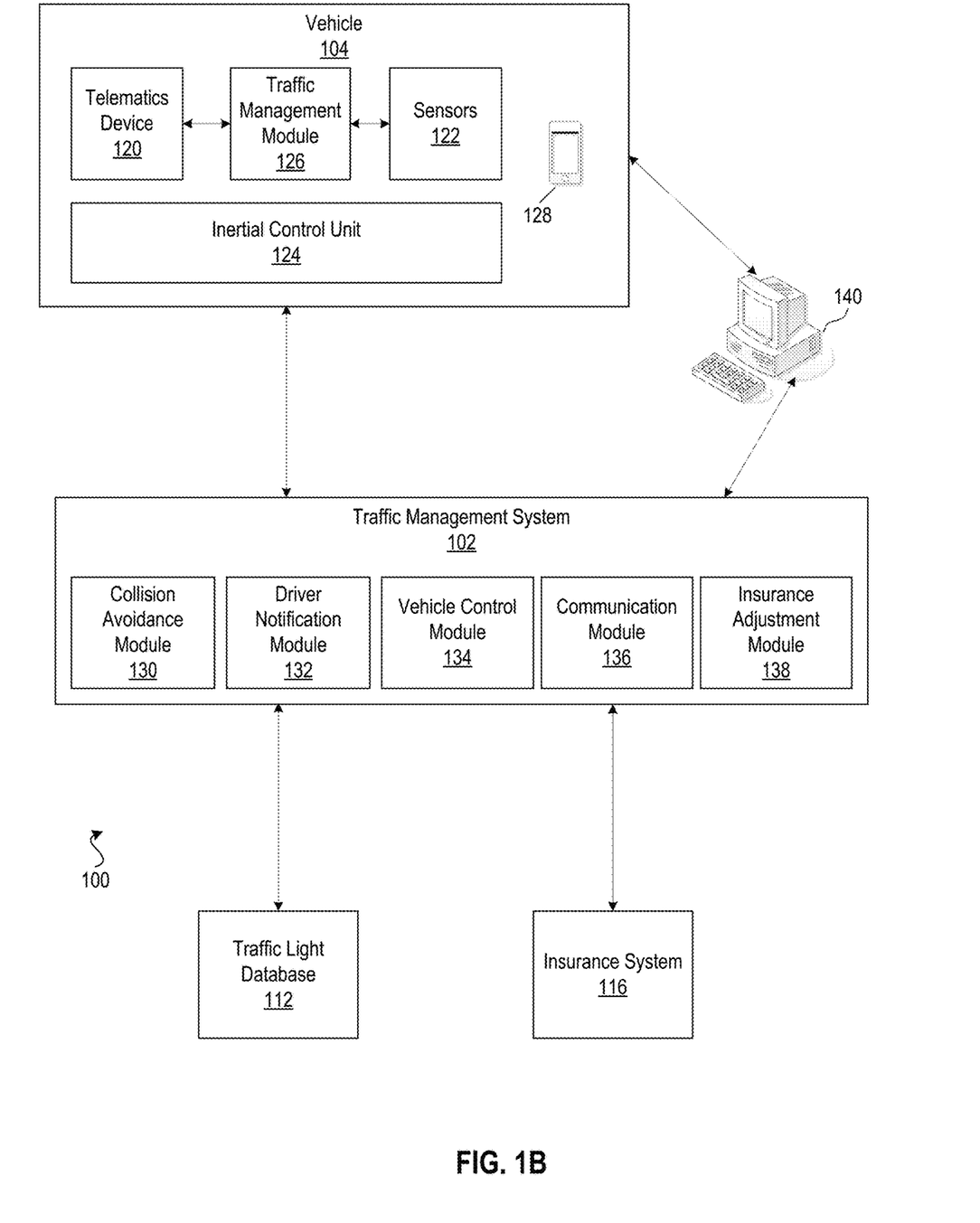
FIG. 1B is a block diagram illustrating various components and devices of an example traffic management system, according to one or more aspects of the disclosure.

FIG. 1B is an illustration of an example implementation of a computing system 100. The computing system 100 may include a traffic management system 102. The traffic management system 102, described in further detail below, may determine whether there is a likelihood of a collision, based on information about a vehicle and any traffic lights near the vehicle. Information about a vehicle may include vehicle operation data. Vehicle operation data, as used in this description, refers to how a driver operates a vehicle with respect to, e.g., accelerating, decelerating, braking, turning, signaling, and other driving-related operations performed by the driver at the vehicle. A vehicle operation data collection device may be installed at, attached to, and/or in signal communication with a vehicle and/or various systems and/or components of the vehicle.

The traffic management system 102 may contain some or all of the hardware/software components as the computing device 101 depicted in FIG. 1A. The traffic management system 102 may include hardware, software, and network components to receive vehicle driving data from one or more vehicles 104, a traffic light database 112, and one or more insurance systems 116, and other data sources. The traffic management system 102 may initiate communication with and/or retrieve driving data from a vehicle 104 wirelessly via telematics devices 120, mobile devices 128, or by way of separate computing systems (e.g., computer 140) over one or more computer networks (e.g., the Internet). Additionally, the traffic management system 102 may receive additional data relevant to traffic management determinations from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.)

In some examples, the traffic management system 102 may acquire information about a vehicle directly from the vehicle 104, where the vehicle operation data may be generated at the vehicle 104 itself. The vehicle 104 may be, for example, an automobile, motorcycle, scooter, bus, recreational vehicle, boat, bicycle, or other vehicle for which a vehicle operation data may be analyzed and for which traffic management determinations may be made. The vehicle 104 may include one or more sensors 122, which are capable of detecting and recording various conditions at the vehicle and operational parameters of the vehicle. For examples, sensors 122 may detect and store data corresponding to the vehicle's location (e.g., GPS coordinates), speed and direction, rates of acceleration or braking, and specific instances of sudden acceleration, braking, and swerving. Sensors 122 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Certain vehicle sensors 122 also may collect information regarding the driver's route choice, whether the driver follows a given route, and to classify the type of trip (e.g. commute, errand, new route, etc.). A Global Positioning System (GPS), locational sensors positioned inside the vehicle 104, and/or locational sensors or devices external to the vehicle 104 may be used determine the route, lane position, and other vehicle position/location data.

The data collected by vehicle sensors 122 may be stored and/or analyzed within the respective vehicle 104, and/or may be transmitted to one or more external devices. For example, as shown in FIG. 1B, sensor data may be transmitted to a traffic management module 140. Additionally, the sensor data may be transmitted via a telematics device 120 to one or more remote computing devices, such as a traffic management system 102. A telematics devices 120 may be a computing device containing many or all of the hardware/ software components as the computing device 101 depicted in FIG. 1A. As discussed above, the telematics device 120 may receive vehicle operation data and driving data from vehicle sensors 122, and may transmit the data to one or more external computer systems (e.g., traffic management system 102 of an insurance company, financial institution, or other entity) over a wireless transmission network. Telematics devices 120 also may be configured to detect or determine additional types of data relating to real-time driving and the condition of the vehicle 104. In certain embodiments, the telematics device 120 may contain or may be integral with one or more of the vehicle sensors 122. The telematics device 120 also may store the type of their respective vehicle 104, for example, the make, model, trim (or sub-model), year, and/or engine specifications, as well as other information such as vehicle owner or driver information, insurance information, and financing information for the vehicle 104.

In the example shown in FIG. 1B, the telematics device 120 may receive vehicle operation data from vehicle sensors 122, and may transmit the data to a traffic management system 102. However, in other examples, one or more of the vehicle sensors 122 may be configured to transmit data directly to a traffic management system 102 without using a telematics device. For instance, a telematics device 120 may be configured to receive and transmit data from certain vehicle sensors 122, while other sensors may be configured to directly transmit data to a traffic management system 102 without using the telematics device 120. Thus, telematics devices 120 may be optional in certain embodiments.

In certain embodiments, a mobile computing device 128 within the vehicle 104 may be used to collect vehicle operation data and/or to receive vehicle operation data from sensors 122, and then to transmit the vehicle operation data to the traffic management system 102 and other external computing devices. Mobile computing device 128 may be, for example, mobile phones, personal digital assistants (PDAs), or tablet computers of the drivers or passengers of the vehicle 104. Software applications executing on the mobile devices 128 may be configured to detect certain vehicle operation data independently and/or may communicate with vehicle sensors 122 to receive additional vehicle operation data. For example, the mobile device 128 equipped with GPS functionality 126 may determine vehicle location, speed, direction and other basic vehicle operation data without needing to communicate with the vehicle sensors 122, or any vehicle system. In other examples, software on the mobile device 128 may be configured to receive some or all of the vehicle operation data collected by vehicle sensors 122.

When the mobile computing device 128 within the vehicle 104 are used to detect vehicle operation data and/or to receive vehicle operation data from the vehicle 104, the mobile computing device 128 may store, analyze, and/or transmit the vehicle operation data to one or more other devices. For example, the mobile computing device 128 may transmit vehicle operation data directly to a traffic management system 102, and thus may be used in conjunction with or instead of the telematics device 120. Moreover, the processing components of the mobile computing device 128 may be used to analyze vehicle operation data, analyze traffic light data, notify and control the vehicle, and perform other related functions. Therefore, in certain embodiments, the mobile computing device 128 may be used in conjunction with, or in place of, the traffic management module 126.

The vehicle 104 may include a traffic management module 126, which may be separate computing devices or may be integrated into one or more other components within the vehicle 104, such as the telematics device 120, or the internal computing systems of the vehicle 104. As discussed above, the traffic management module 126 also may be implemented by computing devices independent from the vehicle 104, such as the mobile computing devices 128 of the drivers or passengers, or one or more separate computer systems 140 (e.g., a user's home or office computer). In any of these examples, the traffic management module 126 may contain some or all of the hardware/software components as the computing device 101 depicted in FIG. 1A. Thus, in some examples, the traffic management system 102 may be included in the traffic management module 126, whereby the traffic management system 102 may be separate computing devices or may be integrated into one or more other components within the vehicle 104. In other implementations, the functionality of the traffic management module 126, such as storing and analyzing vehicle operation data, analyzing traffic light, and notifying and controlling the vehicle, may be performed in a traffic management system 102 rather than by the individual vehicle 104. In such implementations, the vehicle 104 might only collect and transmit vehicle operation data to a traffic management system 102, and thus the vehicle-based traffic management module 126 may be optional.

The traffic management module 126 may be implemented in hardware and/or software configured to receive vehicle operation data from the vehicle sensors 122, the telematics device 120, and/or other vehicle operation data sources. After receiving the vehicle operation data, the traffic management module 126 may perform a set of functions to analyze the vehicle operation data, receive and analyze traffic light data, and notify and control the vehicle 104 accordingly. For example, the traffic management module 126 may include one or more vehicle operation data analysis or vehicle control algorithms, which may be executed by software running on generic or specialized hardware within the traffic management module 126. Within the traffic management module 126, a collision detection function may use the results of the vehicle operation data analysis performed by the module 126 to determine whether to warn or take control of the vehicle 104 in order to avoid a collision. Further descriptions and examples of the algorithms, functions, and analyses that may be executed by the traffic management module 126 are described below in reference to FIGS. 2-4.

The traffic management system 102 may also acquire information about traffic lights near a vehicle. Traffic light information, as used in this description, refers to characteristics of a traffic light which may be used to determine whether there is a likelihood of collision involving the vehicle, e.g., an absolute location of the traffic light, a lighting cycle of the traffic light, a current color of the traffic light, a transition time before the color of the traffic light changes, a direction of traffic being controlled, etc. In some examples, the traffic management system 102 may acquire all necessary traffic light information from a traffic light database 112. A traffic light database 112 may be a data repository including traffic light information. As such, a traffic light database 112 represents a central location for storing and maintaining data pertaining to traffic lights. In some examples, a traffic light database 112 may be a conventional database (e.g., a relational model). It will be appreciated that a traffic light database 112 may also be implemented using other types of data storage (e.g., file system, cache, noSQL database, etc.). The traffic light database 112 may be maintained by a private or governmental entity, and may contain either open source or proprietary data. Further, the traffic light database 112 may be a remote central database, and may maintain traffic light information for all traffic lights within a particular region. In some examples, the use of a remote central database for traffic light information may provide an efficient use of system resources and ensures consistency. In such examples, the traffic light database 112 may be in signal communication with the traffic management system 102 via a network. The network may include one or more of a wired network (e.g., the Internet), a wireless network (e.g., a cellular network, Bluetooth, NFC), or a combination or wired or wireless networks. The traffic management system 102 may be in direct communication with the traffic light database 112, or may be in indirect communication with the traffic light database 112 via a remote service (e.g., web service). In some examples, the traffic light database 112 may contained within the traffic management system 102, or otherwise available within the vehicle 104.

In other examples, the traffic management system 102 may acquire the necessary traffic light information from a combination of sources. For instance, the traffic management system 102 may determine the absolute location of a traffic light from a traffic light database 112 or from traffic lights directly, but it may determine the current light status using sensors 122 installed on the vehicle 104. Thus, a traffic light may be configured to transmit data directly to the traffic management system 102 via a network. The network may include one or more of a wired network (e.g., the Internet), a wireless network (e.g., a cellular network, Bluetooth, NFC), or a combination or wired or wireless networks.

The traffic management system 102 may determine whether there is a likelihood of a collision involving the vehicle, based on the information acquired about the vehicle and nearby traffic lights. If there is a sufficient likelihood of a collision, the traffic management system 102 may issue a notification or warning to the vehicle 104 to accelerate, decelerate, brake, or take other action. The notification or warning may be communicated directly to the vehicle 104 or to the computing device 128 via networks. In some examples, the notification or warning may be communicated via a device attached or installed on the vehicle (e.g., a dashboard, a smart vehicle seat, a smart seatbelt, a MOBILEYE® product, etc.). Such a device may be capable of displaying textual or graphical notifications or warnings. Further, the device may be capable to emitting audio notifications or warnings (e.g., a smart speaker, etc.). In other examples, the notification or warning may be communicated via a device independent from the vehicle (e.g., a smartphone, a wearable device, a smart belt, etc.). If the vehicle does not respond as expected, the traffic management system 102 may take control of the vehicle 104 via an inertial control unit 124. The inertial control unit 124 allows the traffic management system 102 to remotely operate the vehicle (e.g. accelerate, decelerate, brake, turn, etc.). The traffic management system 102 may be in signal communication with the inertial control unit 124 via a network.

In some examples, the traffic management system 102 may determine an insurance adjustment for the driver of the vehicle. The driver of the vehicle may be an existing or potential customer of an insurance company 116. Where the driver of the vehicle appropriately responded to the notification or warning of the traffic management system 102, the traffic management system 102 may recommend an insurance benefit for the driver of the vehicle with the insurance company 116. The insurance benefit may incentivize safe driving and use of the traffic management system 102. Conversely, where the traffic management system 102 is required to take control of the vehicle in order to avoid a collision, the traffic management system 102 may recommend a penalty for the driver of the vehicle with the insurance company 116. The traffic management system 102 may be in signal communication (e.g., communicatively coupled) with the insurance company 116 via a network 118. The network 118 may include one or more of a wired network (e.g., the Internet), a wireless network (e.g., a cellular network, Bluetooth, NFC), or a combination of wired or wireless networks.

FIG. 1B also shows an example implementation a traffic management system 102. The traffic management system 102 may include various components, modules, and subsystems that facilitate various tasks, including determining the likelihood of a collision, issuing an appropriate warning or notification, taking control of a vehicle if necessary, issuing a warning or notification to other vehicles, and determining insurance adjustments to drivers. In this example, the traffic management system 102 includes a collision avoidance module 204, a driver notification module 206, a vehicle control module 208, a communication module 210, and an insurance adjustment module 212. Example implementations of the collision avoidance module 204, a driver notification module 206, a vehicle control module 208, a communication module 210, and an insurance adjustment module 212 will be described in further detail below. It will be appreciated that the traffic management system 102 illustrated in FIG. 1B is shown by way of example and that other implementations of the traffic management system 102 may include additional or alternative components, modules, sub-systems, and so forth.

Figure 2:
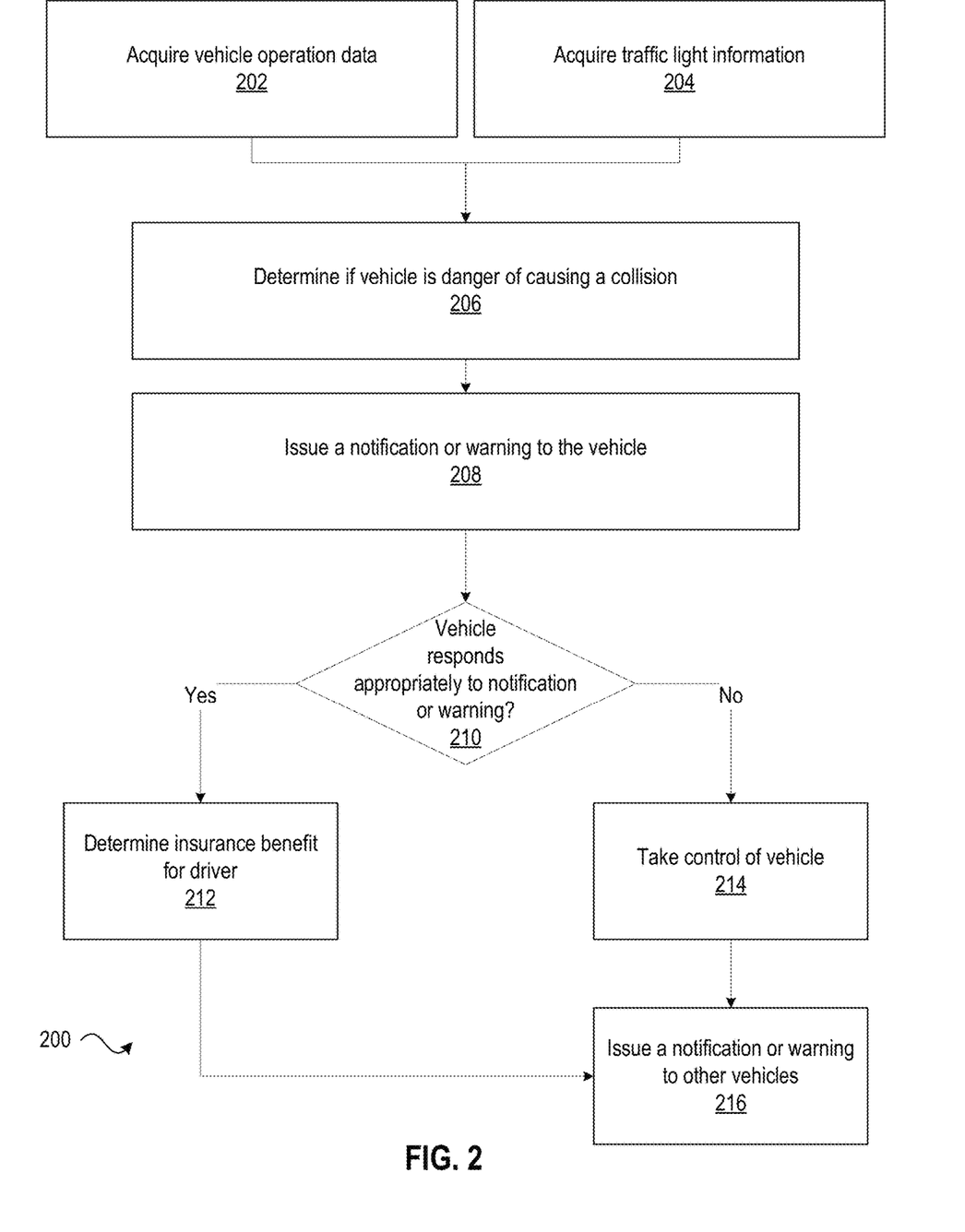
FIG. 2 is a flowchart of high-level example method steps of a traffic management system.

Referring now to FIG. 2, a flowchart 200 of high-level example steps of a traffic management system 102 is shown. The various components of the traffic management system 102 may be used to perform these method steps. The collision avoidance module 130 may acquire vehicle operation data (block 202). The collision avoidance module 130 may receive the vehicle operation data directly from the vehicle 104, from a computing device 128, or a combination thereof. The collision avoidance module 130 may also acquire traffic light information for one or more traffic lights (block 204) from a traffic light database 112, from the vehicle 104, from a computing device 128, or a combination thereof. The vehicle operation data and traffic light information may include timestamps indicating the time at which the data was collected. The timestamps ensure that the subsequent determinations made by the collision avoidance module 130 are minimally affected by latency (e.g., network latency, computer system latency) between the request and the receipt of the data by the collision avoidance module 130.

Figure 3:
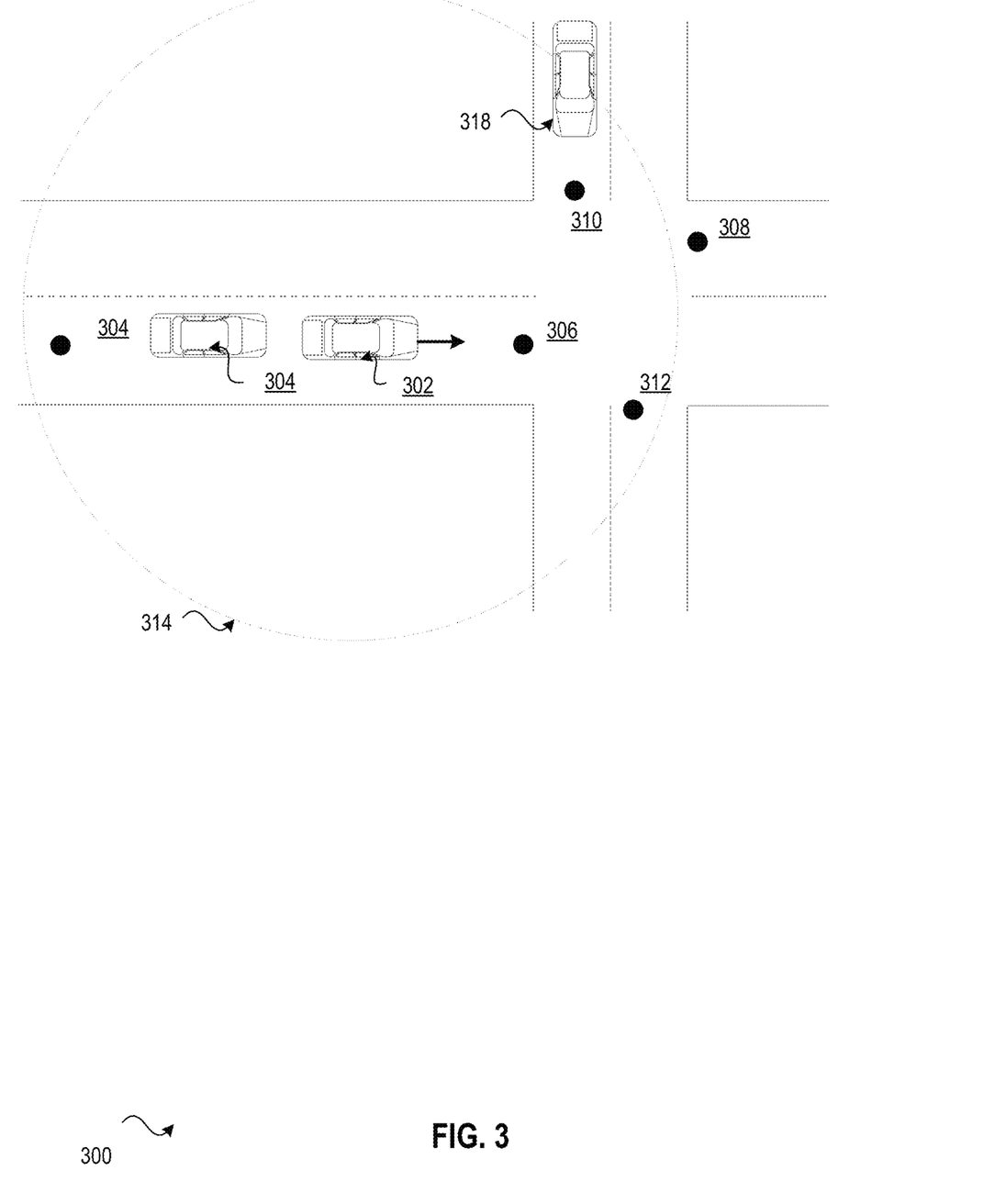
FIG. 3 is a diagram illustrating an example implementation of a traffic management system.

Referring now to FIG. 3, a diagram of an example traffic light arrangement is shown, wherein several traffic lights are within the predetermined radius 314 of a vehicle 302. In some examples, the collision avoidance module 130 may request traffic light information for all traffic lights within a predetermined radius of an actual location of the vehicle 302. Thus, where the predetermined radius is denoted by a circle 314, the collision avoidance module 130 may request traffic light information for traffic lights 304, 306, 310, and 312, but not for traffic light 308. Alternatively, in other examples, the collision avoidance module 130 may only request traffic light information for some traffic lights within a predetermined radius of an actual location of the vehicle 302. For example, the collision avoidance module 130 may only request traffic information for traffic lights being approached by the vehicle 104, based on the vehicle's direction of travel, as indicated by the vehicle operation data. Thus, where the predetermined radius is denoted by a circle 314, and the vehicle 302 is travelling eastward toward traffic light 306, the collision avoidance module 130 may only request traffic light information for traffic light 306. Limiting the number of traffic lights for which the collision avoidance module 130 requests traffic light information advantageously increases the efficiency of the traffic management system 102, and reduces the possibility of false positives when determining the likelihood of collision, as described in further detail below.

Figure 4:
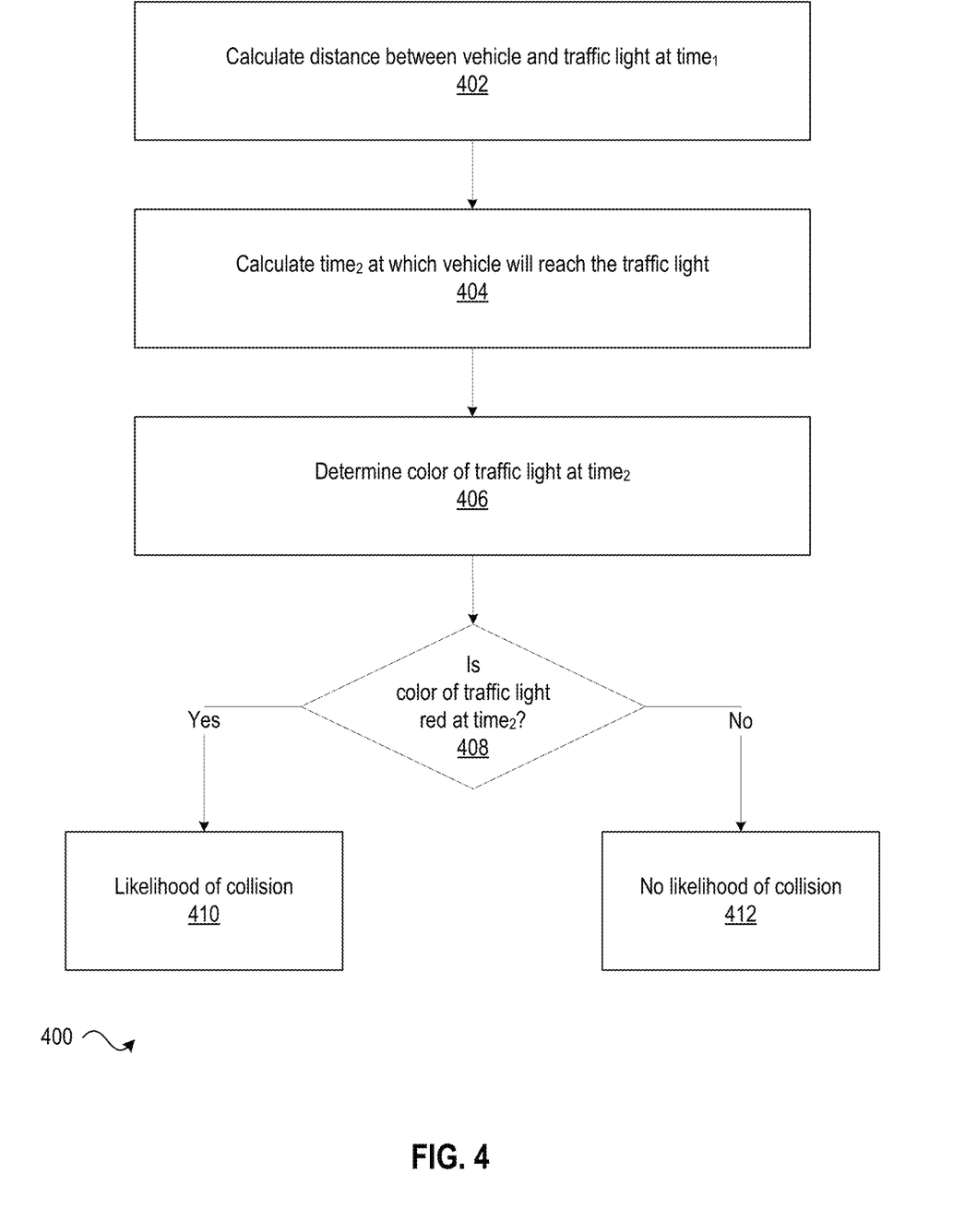
FIG. 4 is a flowchart of example method steps for determining a collision involving a first vehicle.

Now referring back to FIG. 2, based on the acquired vehicle operation data and traffic light information, the collision avoidance module 130 determines the likelihood of a collision involving the vehicle (block 206). A collision may be likely if the vehicle will run a red traffic light at its current speed. In FIG. 4, a flowchart 400 of example steps to determine whether a vehicle will run a red light is shown. The collision avoidance module 130 may first compare the location (e.g., absolute location) of a vehicle with the location (e.g., absolute location) of a traffic light (e.g., stop/go light indicator, railroad crossing indicator, stop sign, yield sign, feeder ramp stop/go light indicator, and/or others) to calculate a distance between the two at a particular time (block 402). The time may be based on the timestamp included in the vehicle operation data (e.g., $time_1$). Based on the calculated distance at $time_1$, the collision avoidance module 130 may calculate the time at which the vehicle will reach the absolute location of the traffic light (e.g., $time_2$) (block 404). In calculating $time_2$, the collision avoidance module 130 may assume that the vehicle will travel at a constant velocity in the same direction as indicated by the vehicle operation data. Alternatively, in calculating $time_2$, the collision avoidance module 130 may adjust the calculation to be based on the rate of acceleration or deceleration as indicated by the vehicle operation data.

The collision avoidance module 130 may then determine the color of the traffic light at the time at which the vehicle will reach the traffic light (e.g., $time_2$) (block 406). In some examples, the color of the traffic light at $time_2$ may be based at least on the color of the traffic light at a particular time (e.g., $time_3$), a transition time to the next color, and the lighting cycle of the traffic light, as provided by the traffic light information. The traffic light information may also provide the different colors and/or signals the traffic light is capable of showing (e.g., Red, Yellow, Green, Left Turn, Straight, Right Turn, or any combination thereof). In some examples, the collision avoidance module 130 may assume that the each color of the traffic light has an equal lighting cycle time. In other examples, the traffic light information may also provide a lighting cycle time corresponding to each color or signal (e.g., Green=60 seconds, Yellow=5 seconds, Red=60 Seconds). Accordingly, the collision avoidance module 130 may determine the color of the traffic light at $time_2$ by calculating the difference between $time_2$ and $time_3$, and determine how many lighting cycles may have been completed within that difference.

For illustration purposes only, the following example details how the collision avoidance module 130 may calculate the color of the traffic light at $time_2$:

TABLE 1

| Example Traffic Light Information | |
|---|---|
| $Time_3$ | 14:00:00 (hh:mm:ss) |
| $Time_2$ | 14:01:30 (hh:mm:ss) |

TABLE 1-continued

Example Traffic Light Information

| | |
|---|---|
| Transition time to next color (Yellow) | 00:00:10 (hh:mm:ss) |
| Lighting cycle | 00:01:00 (Assume equal lighting cycles) |
| Colors of the traffic light | {Green, Yellow, Red} |
| Color at time$_3$ | Green |

The collision avoidance module 130 may perform the following calculations based on the traffic light information presented above in Table 1:

Time Difference:
=Time$_2$−Time$_3$
=14:01:30−14:00:00
=00:01:30

Number of Complete Cycles:
=(Time difference−Transition time to next color)/Lighting cycle
=(00:01:30−00:00:10)/00:01:00
=00:01:20/00:01:00
=1 complete cycle Thus, in this example, the color of the traffic light at 14:00:00 (time$_3$) is expected to be Green, the color of the traffic light at 14:00:10 (Transition) is expected to be Yellow, and the color of the traffic light at 14:01:30 (time$_2$) is expected be Red. Thus, the color of the traffic light at the time at which the vehicle will reach the traffic light (e.g., time2) is expected be Red.

It will be appreciated that a similar calculation may be performed where the traffic light is capable of displaying more or less colors or signals (e.g., right for left turn, yellow for left turn, green for left turn, etc.). It will also be appreciated that the above calculation may be adjusted to reflect varying lighting cycles for each color or signal. Additionally, it will be appreciated that the above calculation may be adjusted to reflect lighting cycles dependent on the time of day. For instance, a traffic light may have a first lighting cycle during peak traffic hours, and a second lighting cycle during non-peak traffic hours. For example, in some cities, after a particular time of day, the traffic light may display only one color (e.g., green, yellow, red). Further, it will be appreciated that time$_1$, time$_2$, and time$_3$ may represent the same or different timestamps, and may represent different a chronological order (e.g., time$_1$>time$_2$>time$_3$, time$_1$>time$_3$>time$_2$).

In some examples, the collision avoidance module 130 may determine the likelihood of a collision involving the vehicle based on whether the traffic light will be red at the time at which the vehicle will reach the traffic light (block 408). Where a traffic light will be red, the collision avoidance module 130 may determine that there is a likelihood of a collision (block 410). Where the traffic light will not be red, the collision avoidance module 130 may determine that there is a negligible likelihood of collision (block 412). In some examples, the likelihood of a collision may be expressed as a numerical value, a rating (e.g., a set or range of values), a category (e.g., Low, Medium, High, Critical), or other value. In some examples, the collision avoidance module 130 may further compare the likelihood of a collision to a threshold value, rating, or category to determine whether there is sufficient likelihood of a collision to warrant action by the traffic management system 102. For example, there may be a sufficient likelihood of a collision where the collision avoidance module 130 determines that the likelihood of a collision is greater than or equal to the threshold value.

It should be noted that in these examples, the collision avoidance module 130 determines the likelihood of a collision based on only one vehicle's operation data with relation to a traffic light, but in other examples, the collision avoidance module 130 may account for multiple vehicles' operation data with relation to one or more traffic lights. For example, a first vehicle may have a low likelihood of a collision with respect to its own vehicle operation data, but a nearby rogue (or other irregularity) second vehicle may cause the first vehicle to have a higher likelihood of a collision. For example, an ambulance, fire truck, police car, or other emergency vehicle may cause a traffic light to prematurely shift from one value (e.g., green light) to another value (e.g., amber, then red light), as is known to a skilled person in the art. In such examples, the traffic light may communicate with the traffic light database 112 to update the traffic light information such that it reflects the new value of the traffic light. Thus, the collision avoidance module 130 may include such information in its determination of the likelihood of a collision.

In other examples, where an emergency vehicle causes a traffic light to change value, the traffic light may communicate directly with the vehicle 104. As such, the traffic light may issue a notification or warning to the vehicle based on the changed value. The notification or warning issued directly by the traffic light may, in some examples, override or supersede the notification or warning issued by the traffic management system 102.

Referring back to FIG. 2, if there is a sufficient likelihood of a collision, the collision avoidance module 130 may recommend the driver notification module 132 to issue a notification or warning to the vehicle. Accordingly, the driver notification module 132 may issue a notification or warning to the vehicle based on the recommendation provided by the collision avoidance module 130 (block 208). The collision avoidance module 130 may recommend issuing a notification or warning where there is a likelihood of a collision involving the vehicle, as determined by the collision avoidance module 130 (block 206). For example, the notification or warning may advise the driver to increase the rate of acceleration to ensure that the color of the traffic light is not red when the vehicle passes the traffic light's absolute location. Alternatively, the notification or warning may advise the driver to decrease the rate of acceleration or apply the brake to ensure that the vehicle is able to come to a complete stop at the traffic light.

The notification or warning may be, for example, a combination of audio, text, graphics, or other gestures (e.g., vibrations). In some examples, the notification or warning may be communicated to a driver of a vehicle via a dashboard installed or attached to the vehicle. In other examples, the notification or warning may be communicated to the driver of the vehicle via a mobile device or a wearable device. Further, the notification may serve as a disruptive alarm to the driver of the vehicle, or a passive notification. For instance, where the vehicle is quickly approaching a traffic light that is expected to be red, and the recommendation of the collision avoidance module 130 requires a quick reaction from the vehicle, the driver notification module 132 may elect to issue an alarm. Conversely, where the vehicle is still a safe distance away from a traffic light that is expected to be red, the driver notification module 132 may choose to issue a more passive notification. For example, the driver notification module 132 may choose warn the user through a vibration of a vehicle component in contact with the driver (e.g., the steering wheel, one or more pedals, etc.).

In other examples, in making the recommendation, the collision avoidance module 130 may also consider the prescribed speed limit, pedestrian or cyclist traffic, weather, and the like. For example, where the collision avoidance module 130 makes a determination that the traffic light is expected to be red at the time when the vehicle reaches the traffic light, the collision avoidance module 130 may recommend issuing a notification to decrease the rate of acceleration or applying the brake, even where the driver may be able to pass the traffic light before it turns red. This recommendation may be because the rate of acceleration required to pass the traffic light before it turns red would cause the vehicle to exceed the prescribed speed limit. Alternatively, this recommendation may be because of high pedestrian or cyclist traffic, whereby a vehicle with a high rate of acceleration would endanger the public. Conversely, the collision avoidance module 130 may recommend issuing notification to increase the rate of acceleration, even where the driver may be able to come to a complete stop at the traffic light by decreasing the rate of acceleration or applying the brake. This recommendation may be due to slippery roads, or the impact of hard braking on the driver and other passengers of the vehicle.

After issuing the notification or warning, the driver notification module 132 may determine whether the vehicle responds appropriately to the notification or warning (block 210). The determination may be based on the whether the vehicle responds within a specified time to the notification or warning. Thus, in some examples, the notification or warning by the driver notification module 132 may include a another response time within which the vehicle must demonstrate cooperation with the traffic management system 102. It will be appreciated that the response time may be directly proportional to the distance between the vehicle and the traffic light at the time of issuing the notification or warning. For example, the response time may be more where the distance is large, whereas the response time may be less where the distance is small.

Additionally or alternatively, the determination may be based on whether the vehicle adjusts the rate of acceleration as specified by the notification or warning. For example, the driver notification module 132 may determine whether the vehicle sufficiently increases or decreases the rate of acceleration such that the vehicle may pass or stop at the traffic light. For example, where the notification or warning instructs the vehicle to increase the rate of acceleration, but the vehicle decreases its rate of acceleration, the driver notification module 132 may determine that the vehicle has not appropriately responded to the notification or warning. In another example, where the notification or warning instructions the vehicle to increase the rate of acceleration (e.g., by 10%, to 60 mph), but the vehicle does not increase the rate of acceleration sufficiently (e.g., only increases by 7%, only increases to 55 mph), the driver notification module 132 may also determine that the vehicle has not appropriately responded to the notification or warning. It will be appreciated that other scenarios may also cause the driver notification module 132 to determine that the vehicle has not appropriately responded to the notification or warning.

Where the driver notification module 132 determines that the vehicle has appropriately responded to the notification or warning, and has consequently avoided a possible collision, the insurance adjustment module 138 may calculate an insurance benefit for the driver of the vehicle (block 212). The insurance adjustment module 138 may communicate the calculated insurance benefit to one or more insurance systems 116. The one or more insurance systems may be current or prospective insurance providers of the driver of the vehicle. For existing customers of an insurance company, an insurance benefit may be, for example, an adjustment of an insurance premium for vehicle insurance. Alternatively, an insurance benefit for existing customers may include discounts for additional insurance policies with the insurance company. Additional insurance benefits may include a discount on adding a driver to the existing insurance policy, a discount on a new vehicle insurance family for family members, or a discount on other types of new insurance policies (e.g. home insurance, life insurance, etc.). For prospective customers of an insurance company, an insurance benefit may be, for example, a discounted rate for a new vehicle insurance policy with the insurance company. The insurance adjustment module 138 may send a check to the driver of the vehicle representing the insurance benefit. In other examples, the insurance adjustment module 138 may provide the insurance benefit electronically (e.g., a coupon code, etc.).

In some examples, the insurance adjustment module 138 may calculate identical insurance benefits for all drivers who appropriately responded to the notification or warning. In other examples, the insurance adjustment module 138 may vary the insurance benefit based, in at least in part, on the vehicle operation data. For example, the insurance adjustment module 138 may adjust the insurance benefit based on the vehicle's response time to the notification or warning, where the relationship between the insurance benefit and the vehicle response time is inversely proportional. In another example, the insurance adjustment module 138 may adjust the insurance benefit in favor of the driver where the notification or warning was issued to the vehicle due to careless or dangerous driving of another vehicle. Conversely, the insurance adjustment module 138 may reduce the insurance benefit where the driver responded to the notification or warning, but where the driver was likely to cause a collision due to speeding, use of a cell phone, or other dangerous or distracting activities.

Alternatively, where the driver notification module 132 determines that the vehicle did not respond appropriately to the notification or warning, the vehicle control module 134 may choose to take control of the vehicle (block 214). The vehicle control module 134 may take control of the vehicle based on the recommendation in the notification or warning, or it may recalculate its determination based on the vehicle's updated location. The vehicle control module 134 may control a vehicle using the inertial control unit, which allows an external system to increase or decrease the acceleration, apply the brakes, direct the vehicle (e.g., turn, reverse, etc.), and so forth. As such, the inertial control unit allows a system or device to control one or more pedals of the vehicle (e.g., brake, accelerator, clutch), the steering wheel, and/or the gear stick.

In some examples, in addition to issuing a notification or warning to the first vehicle, the communication module 136 may also issue notifications or warnings to other vehicles (e.g. automobiles, motorcycles, scooters, buses, recreational vehicles, boats, bicycles, etc.) or pedestrians likely to be affected by the first vehicle (block 216). The communication module 136 may issue notifications or warnings to other vehicles or pedestrians through computing devices (e.g., traffic management modules, mobile computing devices, etc.). The communication module 136 may issue notifications or warnings to the other vehicles after, before, or contemporaneously with the driver communication module 132 notifying or warning the first vehicle. The communication module 136 may issue notifications or warnings to other vehicles within a predetermined radius of the first vehicle. For example, where the driver notification module 132 recommended the first vehicle to make a turn, the communication module 136 may issue notifications or warnings to all nearby vehicles. Alternatively, communication module 136 may only issue notification or warnings to other vehicles travelling in the same direction as the first vehicle, as indicated by the vehicles' operation data, for example, where the driver notification module 132 recommended the first vehicle to increase or decrease the rate of acceleration while maintaining the same direction of travel. For instance, where the driver notification module 132 recommended the first vehicle to increase its rate of acceleration, the communication module 136 may notify or warn the vehicles in front of the first vehicle. In another example, where the driver notification module 132 recommended the first vehicle to decrease the rate of acceleration or apply the brakes, the communication module 136 may notify or warn the vehicles behind the first vehicle.

In an example implementation in accordance with aspects of this disclosure, an insurance company may award discounted vehicle insurance premiums for drivers of vehicles, where the driver appropriately responded to notifications or warnings communicated by the traffic management system. Decreasing insurance premiums for these drivers may encourage more drivers to participate in the vehicular collision avoidance program, thus increasing public safety and awareness. Further, decreasing insurance premiums for drivers may encourage drivers to engage in positive driving behaviors, thereby decreasing the overall likelihood of collision. Additionally, decreasing insurance premiums provides an incentive for an existing insurance customer to maintain an insurance policy with the insurance policy, or provides an incentive for prospective insurance customer to purchase a vehicle insurance policy from the insurance company at a lower rate. In one example, the number of times a driver of a vehicle has appropriately responded to a notification or warning may be used as a rating factor for underwriting an insurance policy for a driver and/or vehicle. As such, when a user applies for automobile insurance, data collected through the systems described herein may be used to underwrite the risk associated with insuring that person and/or vehicle. Data, such as the amount of time elapsed between notification and/or warning of a potential collision and a response to the notification and/or warning, or the number of appropriate responses to notifications and/or warnings in a time period, may be included as one or more rating factors in an insurance policy pricing model. In other examples, an insurance company may increase insurance premiums or decrease discounts on insurance premiums where a driver of a vehicle is consistently unresponsive to notifications and/or warnings, or where the system determines the driver's activity (e.g., speeding, use of a cell phone, etc.) was a factor in the likelihood of a collision. The data may be collected and stored at a remote server and/or data store where an insurance pricing engine may access it and use it in calculating the premium for a requested insurance policy.

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure.

What is claimed is:

1. An apparatus comprising:
   at least one processor; and
   a memory unit storing computer-executable instructions that, when executed by the at least one processor, cause the apparatus to:
   receive first vehicle operation data corresponding to a first vehicle at a first time;
   receive traffic light data associated with a traffic light originating from a traffic light database at a second time, wherein the traffic light database stores information describing one or more traffic lights;
   determine a likelihood of collision associated with the first vehicle at a third time at which the first vehicle will reach the traffic light, based on a determination that a color of the traffic light will be red at the third time, wherein the determination is based, at least in part, on the first vehicle operation data and the traffic light data;
   determine a recommendation for the first vehicle based on the likelihood of collision, wherein the recommendation provides navigational guidance to avoid the collision, wherein the navigational guidance comprises an adjustment that can increase and decrease a rate of acceleration associated with the first vehicle, and wherein the adjustment is based, at least in part, on a prescribed speed limit;
   select a type of notification to output to the first vehicle based on the likelihood of collision, wherein a first type of notification is a passive notification and a second type of notification is an alarm;
   output a notification of the selected type of notification to the first vehicle, wherein the notification includes the recommendation;
   determine whether a response by the first vehicle to the notification meets specified criteria, wherein the specified criteria includes: (a) a response time to the notification output to the first vehicle, and (b) whether the vehicle has increased or decreased the rate of acceleration;
   calculate an insurance benefit associated with a driver of the first vehicle when the response meets the specified criteria, wherein the insurance benefit is based on, at least in part, a response time of the first vehicle to the notification; and
   take control of the first vehicle when the response does not meet the specified criteria.

2. The apparatus of claim 1, wherein:
   the first vehicle operation data comprises a speed of the first vehicle at the first time, an absolute position of the first vehicle at the first time, and a direction of travel of the first vehicle at the first time; and
   the traffic light data comprises an absolute location of the traffic light, a lighting cycle of the traffic light, a color of the traffic light at the second time, a transition time to a next color of the traffic light, and a direction of traffic being controlled by the traffic light.

3. The apparatus of claim 2, wherein determining the likelihood of a collision associated with the first vehicle comprises:
   determining a relative position of the first vehicle with respect to the traffic light at the first time, based on, at least in part, the absolute position of the first vehicle and the absolute position of the traffic light;
   determining the third time at which the first vehicle will reach the traffic light, based on, at least in part, the speed of the first vehicle and the relative position of the first vehicle with respect to the traffic light; and determining the color of the traffic light at the third time, based on, at least in part, a difference between the second time and the third time, the transition time to the next color of the traffic light, the lighting cycle of the traffic light, and the color of the traffic light at the second time.

4. The apparatus of claim 1, wherein the instructions, when executed by the at least one processor, further cause the apparatus to:

take inertial control of the first vehicle, responsive to an inappropriate reaction to the notification from the first vehicle.

5. The apparatus of claim 1, wherein the instructions, when executed by the at least one processor, further cause the apparatus to:

select a first set of second vehicles and outputting a notification to the first set of second vehicles in a case where the notification relates to a first type of navigation guidance; and select a second set of second vehicles and outputting a notification to the second set of second vehicles in a case where the notification relates to a second type of navigation guidance, the first set of second vehicles being different from the second set of second vehicles, wherein the notification includes the recommendation determined for the first vehicle.

6. A computer-implemented method comprising:

receiving first vehicle operation data originating from a first vehicle at a first time;

receiving traffic light data originating from a traffic light database at a second time, wherein the traffic light database stores information describing one or more traffic lights;

determining a likelihood of collision associated with the first vehicle at a third time at which the first vehicle will reach a traffic light, based on a determination that a color of the traffic light will be red at the third time, wherein the determination is based, at least in part, on the first vehicle operation data and the traffic light data;

determining a recommendation for the first vehicle based on the likelihood of collision, wherein the recommendation provides navigational guidance to avoid the collision, wherein the navigational guidance comprises an adjustment that can increase and decrease a rate of acceleration associated with the first vehicle, and wherein the adjustment is based, at least in part on a prescribed speed limit;

selecting a type of notification to output to the first vehicle based on the likelihood of collision, wherein a first type of notification is a passive notification and a second type of notification is an alarm;

outputting a notification of the selected type of notification to the first vehicle, wherein the notification includes the recommendation;

determining whether a response by the first vehicle to the notification meets specified criteria, wherein the specified criteria includes: (a) a response time to the notification output to the first vehicle, and (b) whether the vehicle has increased or decreased the rate of acceleration;

calculating an insurance benefit associated with an individual associated with the first vehicle when the response meets the specified criteria, wherein the insurance benefit is based on, at least in part, a response time of the first vehicle to the notification; and taking control of the first vehicle when the response does not meet the specified criteria.

7. The computer-implemented method of claim 6, wherein:

the first vehicle operation data comprises a speed of the first vehicle at the first time, an absolute position of the first vehicle at the first time, and a direction of travel of the first vehicle at the first time; and the traffic light data comprises an absolute location of the traffic light, a lighting cycle of the traffic light, a color of the traffic light at the second time, a transition time to a next color of the traffic light, and a direction of traffic being controlled by the traffic light.

8. The computer-implemented method of claim 7, wherein determining the likelihood of a collision associated with the first vehicle comprises:

determining a relative position of the first vehicle with respect to the traffic light at the first time, based on, at least in part, the absolute position of the first vehicle and the absolute position of the traffic light;

determining the third time at which the first vehicle will reach the traffic light, based on, at least in part, the speed of the first vehicle and the relative position of the first vehicle with respect to the traffic light; and determining the color of the traffic light at the third time, based on, at least in part, a difference between the second time and the third time, the transition time to the next color of the traffic light, the lighting cycle of the traffic light, and the color of the traffic light at the second time.

9. The computer-implemented method of claim 7 further comprising:

taking inertial control of the first vehicle, responsive to an inappropriate reaction to the notification from the first vehicle.

10. The computer-implemented method of claim 7 further comprising:

outputting a notification to a second vehicle, wherein the notification includes the recommendation determined for the first vehicle.

11. A vehicle comprising a non-transitory computer-readable medium containing program instructions, wherein execution of the program instructions by one or more processors of a vehicular computer system causes the one or more processors to carry out steps of:

receiving vehicle operation data of the vehicle at a first time;

receiving traffic light data originating from a remote service at a second time via an antenna configured to communicate via wireless communication, wherein the remote service provides access to information describing one or more traffic lights;

determining a likelihood of collision associated with the vehicle at a third time at which the vehicle will reach a traffic light, based on a determination that a color of a traffic light will be red at the third time, wherein the determination is based on the vehicle operation data and the traffic light data;

determining a recommendation for a driver of the vehicle based on the likelihood of collision, wherein the recommendation provides navigational guidance to the vehicle to avoid the collision, wherein the navigational guidance comprises an adjustment that can increase and decrease a rate of acceleration associated with the vehicle, and wherein the adjustment is based, at least in part, on a prescribed speed limit;

selecting a type of notification to output to the vehicle based on the likelihood of collision, wherein a first type of notification is a passive notification and a second type of notification is an alarm;

outputting a notification of the selected type of notification to the driver of the vehicle via a dashboard attached to the vehicle, wherein the notification includes the recommendation determining whether a response by the vehicle to the notification meets specified criteria, wherein the specified criteria includes: (a) a response time to the notification output to the vehicle, and (b) whether the vehicle has increased or decreased the rate of acceleration;

calculating an insurance benefit associated with an individual associated with the vehicle when the response meets the specified criteria, wherein the insurance benefit is based on, at least in part, a response time of the vehicle to the notification; and taking control of the vehicle when the response does not meet the specified criteria.

12. The computer-readable medium of claim 11, wherein:
the vehicle operation data comprises a speed of the vehicle at the first time, an absolute position of the vehicle at the first time, and a direction of travel of the vehicle at the first time; and
the traffic light data comprises an absolute location of the traffic light, a lighting cycle of the traffic light, a color of the traffic light at the second time, a transition time to a next color of the traffic light, and a direction of traffic being controlled by the traffic light.

13. The computer-readable medium of claim 12, wherein determining the likelihood of a collision associated with the vehicle comprises:
determining a relative position of the vehicle with respect to the traffic light at the first time, based on, at least in part, the absolute position of the vehicle and the absolute position of the traffic light;

determining a third time at which the vehicle will reach the traffic light, based on, at least in part, the speed of the vehicle and the relative position of the vehicle with respect to the traffic light; and determining a color of the traffic light at the third time, based on, at least in part, the second time, the third time, the color of the traffic light at the second time, the transition time to the next color, and the lighting cycle.

14. The computer-readable medium of claim 11, wherein the execution of the program instructions further causes the one or more processors to carry out the steps of:
taking inertial control of at least one pedal of the vehicle, responsive to an inappropriate reaction to the notification by the driver of the vehicle.

15. The computer-readable medium of claim 11, wherein the execution of the program instructions further causes the one or more processors to carry out the steps of:
outputting a notification to a driver of another vehicle on a display attached to the another vehicle, wherein the notification includes the recommendation determined for the vehicle.

16. The apparatus of claim 5, wherein:
in a case where the first type of navigation guidance is to accelerate, the first set of second vehicles includes vehicles physically ahead of the first vehicle in a direction of traffic; and
in a case where the second type of navigation guidance is to decelerate, the second set of second vehicles includes vehicles physically behind the first vehicle in the direction of traffic.

17. The apparatus of claim 1, wherein the first type of notification is a vibration of a vehicle component, and the second type of notification is at least one of audio, text, graphics, and vibrations.

18. The apparatus of claim 1, wherein determining the likelihood of collision includes determining second vehicle operation data of a second vehicle and determining the likelihood of collision further based on the second vehicle operation data of the second vehicle.

* * * * *

UNITED STATES PATENT AND TRADEMARK OFFICE
CERTIFICATE OF CORRECTION

PATENT NO. : 10,553,115 B1
APPLICATION NO. : 14/601881
DATED : February 4, 2020
INVENTOR(S) : Ismaili et al.

It is certified that error appears in the above-identified patent and that said Letters Patent is hereby corrected as shown below:

In the Specification

Column 5, Detailed Description, Line 62:
Delete "140." and insert --126.--

Column 9, Detailed Description, Line 20:
Delete "204," and insert --130,--

Column 9, Detailed Description, Line 21:
Delete "206," and insert --132,--

Column 9, Detailed Description, Line 21:
Delete "208," and insert --134,--

Column 9, Detailed Description, Line 22:
Delete "210," and insert --136,--

Column 9, Detailed Description, Line 22:
Delete "212." and insert --138.--

Column 9, Detailed Description, Line 24:
Delete "204," and insert --130,--

Column 9, Detailed Description, Line 24:
Delete "206," and insert --132,--

Column 9, Detailed Description, Line 25:
Delete "208," and insert --134,--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,553,115 B1

Column 9, Detailed Description, Line 25:
Delete "210," and insert --136,--

Column 9, Detailed Description, Line 26:
Delete "212" and insert --138--

Column 11, Detailed Description, Line 29:
Delete "time2)" and insert --time$_2$)--

In the Claims

Column 19, Claim 11, Line 10:
After "recommendation", insert --;--